(12) United States Patent
Sakai et al.

(10) Patent No.: US 10,536,049 B2
(45) Date of Patent: Jan. 14, 2020

(54) ELECTRONIC CONTROL DEVICE AND ELECTRIC POWER STEERING DEVICE

(71) Applicant: HITACHI AUTOMOTIVE SYSTEMS, LTD., Hitachinaka-shi, Ibaraki (JP)

(72) Inventors: Toshihiko Sakai, Yokohama (JP); Takuro Kanazawa, Hitachinaka (JP); Ryoichi Kobayashi, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 85 days.

(21) Appl. No.: 15/503,452

(22) PCT Filed: Sep. 10, 2015

(86) PCT No.: PCT/JP2015/075707
§ 371 (c)(1),
(2) Date: Feb. 13, 2017

(87) PCT Pub. No.: WO2016/043116
PCT Pub. Date: Mar. 24, 2016

(65) Prior Publication Data
US 2017/0237311 A1 Aug. 17, 2017

(30) Foreign Application Priority Data
Sep. 18, 2014 (JP) .................................. 2014-189742

(51) Int. Cl.
*H02K 5/22* (2006.01)
*H02K 11/33* (2016.01)
(Continued)

(52) U.S. Cl.
CPC ........... *H02K 5/225* (2013.01); *B62D 5/0406* (2013.01); *B62D 5/046* (2013.01); *H02K 11/24* (2016.01);
(Continued)

(58) Field of Classification Search
CPC ..................................................... H02K 5/225
(Continued)

(56) References Cited

U.S. PATENT DOCUMENTS

2003/0200761 A1* 10/2003 Funahashi ............... F01C 21/10
62/228.4
2011/0254387 A1 10/2011 Matsuda et al.
(Continued)

FOREIGN PATENT DOCUMENTS

JP 2011-229229 A 11/2011
JP 2013-151206 A 8/2013
(Continued)

*Primary Examiner* — Terrance L Kenerly
(74) *Attorney, Agent, or Firm* — Foley & Lardner LLP

(57) ABSTRACT

An object of the present invention is to reduce an inductance of a power circuit, reduce a switching loss and a noise level and improve a voltage-use ratio of a battery power in a redundant-type electronic control device.

An electronic control device that controls a motor has power modules 11a, 11b to drive the motor. Power terminals 32*pua*, 32*pva* and 32*pwa* of the power module 11a are arranged in positions that are close to and face power terminals 32*nub*, 32*nvb* and 32*nwb* of the power module 11b, which are opposite to the power terminals 32*pua*, 32*pva* and 32*pwa* of the power module 11a in polarity. Power terminals 32*nua*, 32*nva* and 32*nwa* drawn from a longitudinal end portion 311 of the power module 11a are arranged in positions that are close to and face power terminals 32*pub*, 32*pvb* and 32*pwb* drawn from a longitudinal end portion 311 of the power module 11b which are opposite to the power terminals 32*nua*, 32*nva* and 32*nwa* of the power module 11a in polarity.

11 Claims, 6 Drawing Sheets

(51) Int. Cl.
  *H02K 11/24* (2016.01)
  *B62D 5/04* (2006.01)
  *H02M 7/00* (2006.01)
  *H02M 7/537* (2006.01)

(52) U.S. Cl.
  CPC ............ *H02K 11/33* (2016.01); *H02M 7/003* (2013.01); *H02M 7/537* (2013.01)

(58) Field of Classification Search
  USPC .................................................. 310/71, 68 B
  See application file for complete search history.

(56) References Cited

U.S. PATENT DOCUMENTS

| | | | |
|---|---|---|---|
| 2012/0161590 A1* | 6/2012 | Yamasaki | H02K 5/225 310/68 B |
| 2013/0257192 A1 | 10/2013 | Tsuboi et al. | |
| 2014/0084993 A1 | 3/2014 | Takao et al. | |
| 2014/0326530 A1 | 11/2014 | Asao et al. | |

FOREIGN PATENT DOCUMENTS

| | | | |
|---|---|---|---|
| JP | 2013-192403 A | 9/2013 | |
| JP | 2013-207969 A | 10/2013 | |
| JP | 2014-067760 A | 4/2014 | |

\* cited by examiner

ELECTRONIC CONTROL DEVICE AND ELECTRIC POWER STEERING DEVICE

TECHNICAL FIELD

The present invention relates to an electronic control device of a motor and a device employing this control device.

BACKGROUND ART

As an electric power steering device, there has been known a redundant-type power steering device in which two power module systems functioning as an inverter are mounted (for example, in Patent Documents 1 to 3).

In a power steering device of Patent Document 1, power modules are arranged with the power modules facing each other in a radial direction of the power steering device. In this arrangement, in order to dissipate heat generating during operation of the power steering device, two power modules are deliberately separate from each other. Therefore, as a matter of course, terminals of these two power modules are also arranged separately.

In a power steering device of Patent Document 2, a plurality of power modules are arranged in the same plane. A positive electrode side power terminal of one power module is separate from a negative electrode side power terminal of the other power module.

In a power steering device of Patent Document 3, aplurality of sector-shaped (or fan-shaped) powermodules are arranged in the same plane. Also regarding these power modules, in the same manner as Patent Document 2, a positive electrode side power terminal of one power module is separate from a negative electrode side power terminal of the other power module.

CITATION LIST

Patent Document

Patent Document 1: Japanese Unexamined Patent Application Publication No. 2013-207969 (JP2013207969)
Patent Document 2: Japanese Unexamined Patent Application Publication No. 2011-229229 (JP2011229229)
Patent Document 3: Japanese Unexamined Patent Application Publication No. 2013-151206 (JP2013151206)

SUMMARY OF THE INVENTION

In the related art redundant-type power steering devices, since the positive electrode side power terminal of the one power module and the negative electrode side power terminal of the other power module are separate from each other, an inductance of a power circuit of the power steering device increases, a switching loss increases, and also a noise level becomes high. Further, this causes a poor ratio of voltage utilization (or a poor voltage-use ratio, or a poor coefficient of use of voltage) of a battery power.

The present invention was made in view of the above technical problems. An object of the present invention is therefore to reduce the inductance of the power circuit, reduce the switching loss and the noise level and improve the voltage-use ratio of the battery power in the redundant-type electronic control device.

An electronic control device that controls a motor according to the present invention comprises: a plurality of power modules configured to drive the motor, and power terminals of at least one power module among the plurality of power modules are arranged in positions that are close to and face power terminals of the other power module with the power terminals of the one power module and the power terminals of the other power module being opposite to each other in polarity.

Further, an electric power steering device according to the present invention comprises: a plurality of power modules configured to drive a motor, and power terminals of at least one power module among the plurality of power modules are arranged in positions that are close to and face power terminals of the other power module with the power terminals of the one power module and the power terminals of the other power module being opposite to each other in polarity.

According to the present invention, the power terminals of the one power module are arranged in positions that are close to and face power terminals of the other power module with the power terminals of the one power module and the power terminals of the other power module being opposite to each other in polarity. Therefore, magnetic field generated in each power module during operation of the electronic control device is cancelled, and the inductance of the power circuit is reduced.

According to the present invention, since the inductance of the power circuit in the redundant-type electronic control device is reduced, the switching loss is reduced, the noise level isreduced, and the voltage-use ratio of the battery power is improved.

EMBODIMENTS FOR CARRYING OUT THE INVENTION

Embodiments of the present invention will be explained below with reference to the drawings.

Figure 1:
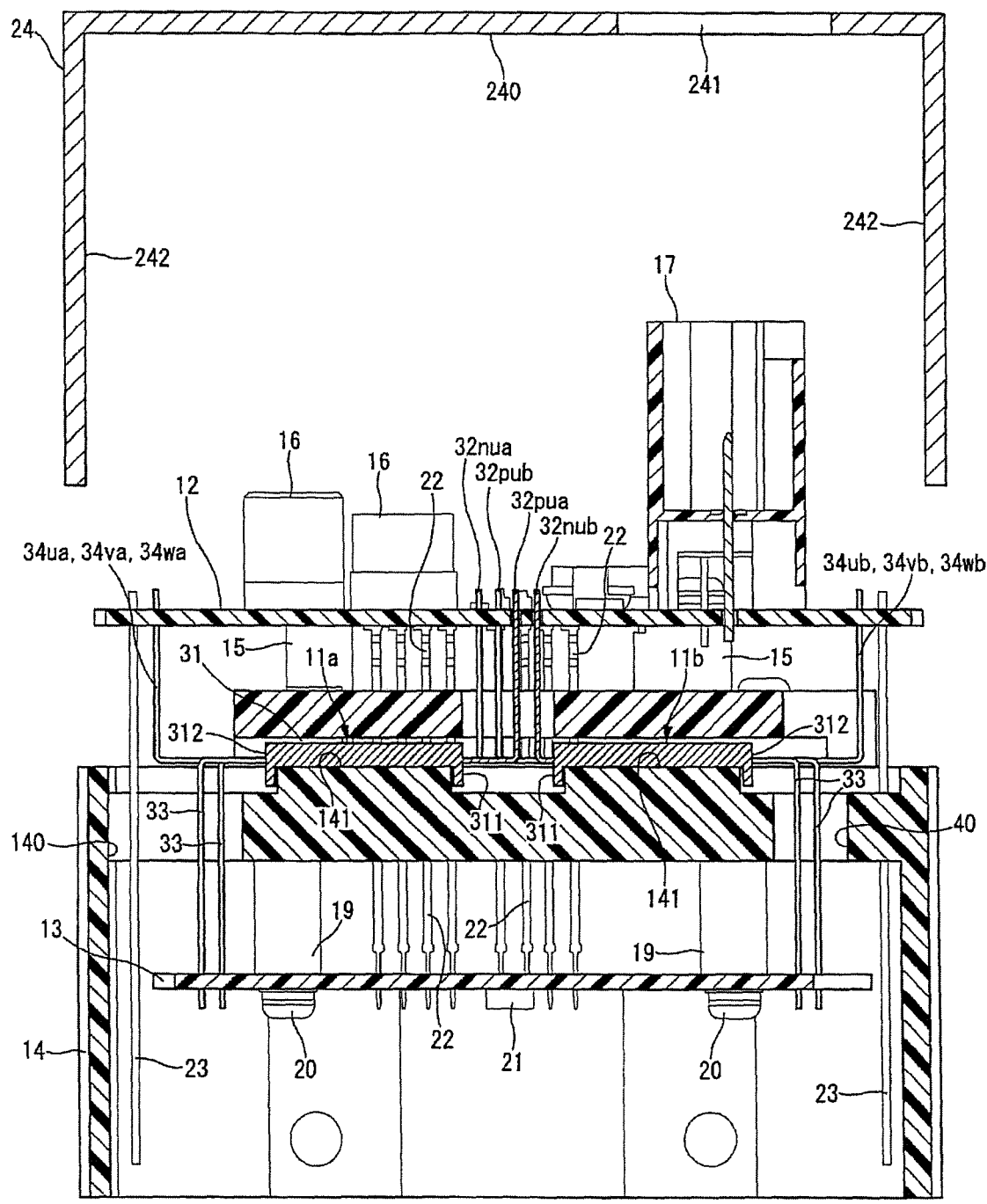
FIG. 1 is a longitudinal cross section of an electronic control device according to a first embodiment of the present invention.
Figure 6:
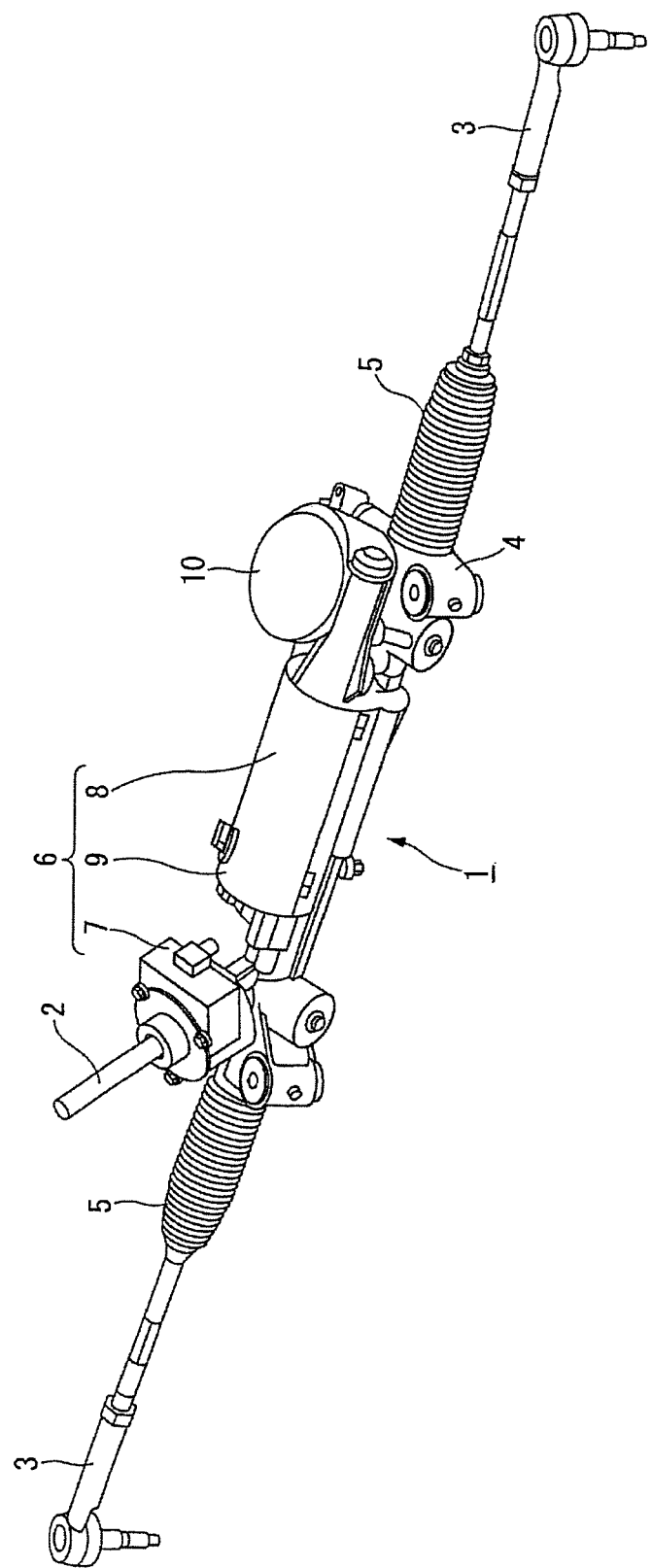
FIG. 6 is a perspective view of an electric power steering device employing the electronic control device.

An electronic control device 9 according to the present embodiment shown in FIG. 1 is an example of an electronic control device that is applied to an electric power steering device 6 provided in a steering mechanism 1 shown in FIG. 6.

The steering mechanisml shown in FIG. 6 is provided with a pinion (now shown) at a lower end of a steering shaft 2 connecting to a steering wheel (not shown). This pinion is engaged with a rack (not shown) that extends in a vehicle body right and left direction. A tie rod 3 to steer a front wheel in right and left directions is each connected to both ends of the rack. The rack is accommodated in a rack housing 4. Between the rack housing 4 and the each tie rod 3, a rubber boot 5 is provided. Further, the steering mechanism 1 is provided with the electric power steering device 6 to assist torque when performing a turning operation of the steering wheel.

The electric power steering device 6 has a torque sensor 7 detecting a turning direction and a turning torque of the steering shaft 2, an electric motor 8 providing a steering assistive force to the rack via a gear 10 on the basis of a detection value of the torque sensor 7, and the electronic control device 9 controlling the electric motor 8. The electric motor 8 is connected to the gear 10 with three portions of an outer periphery on an output shaft side of the electric motor 8 secured to the gear 10 with bolts (not shown). The electronic control device 9 is disposed on an opposite side to the output shaft side of the electric motor 8.

The electric motor 8 is a so-called two-winding motor (double winding motor) in which three-phase windings of two systems are wound inside one stator of the electric motor 8 and three-phase terminals of each system are drawn to the outside. For the sake of convenience, these windings are called a-winding and b-winding. By applying the substantially same three-phase current to the a-winding and the b-winding, the two systems generate the substantially same torque and the substantially same counter-electromotive force in an arbitrary rotation state and an arbitrary load state, then the electric motor 8 is controlled as if two motors having the same characteristics perform the same operation.

As shown in FIG. 1, the electronic control device 9 has power modules 11 of the two systems, and thus has functions of parallel redundant-type inverters that drive the two-winding motor.

That is, the electronic control device 9 has a pair of power modules 11a, 11b which drive the electric motor 8, a power board 12 to which these power modules 11a, 11b are electrically connected and a control board 13 to which the power modules 11a, 11b are electrically connected.

Figure 2:
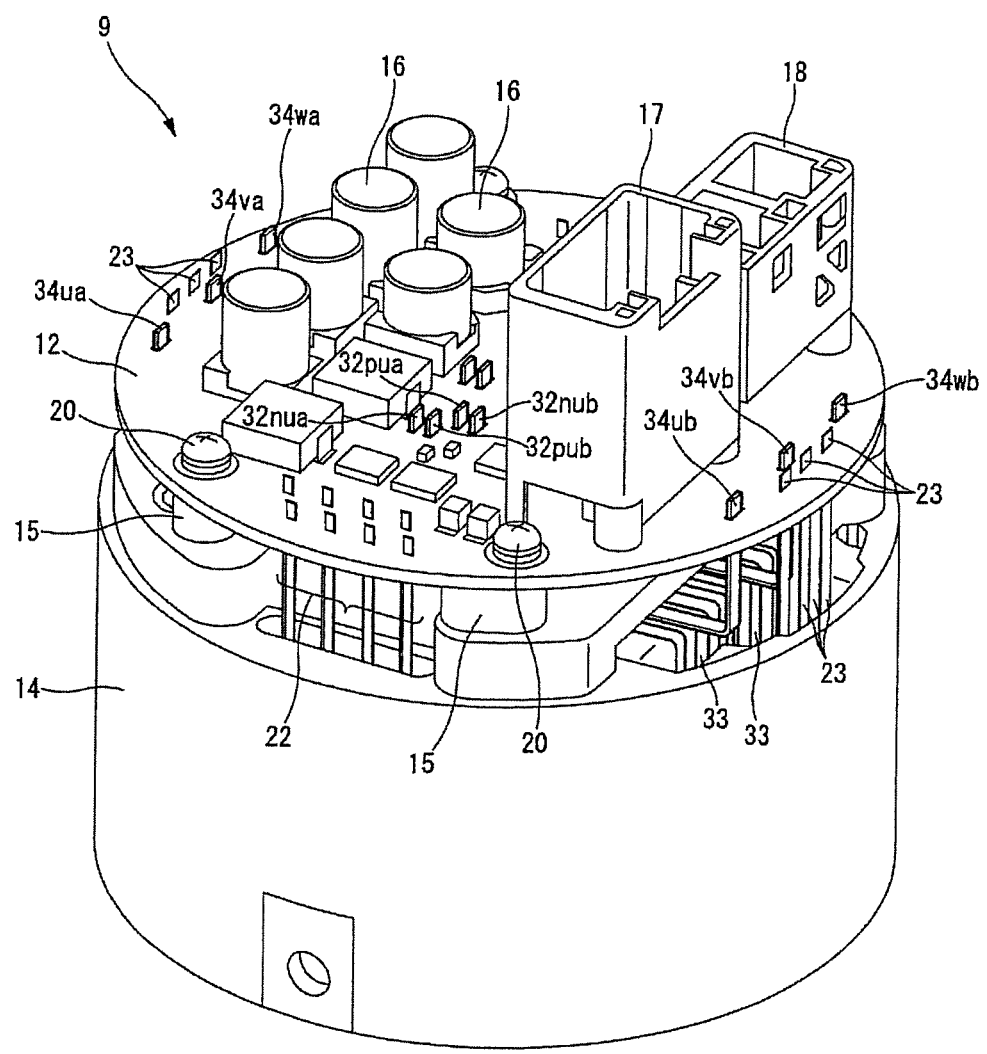
FIG. 2 is a perspective view of the electronic control device.

As shown in FIGS. 1 and 2, the power board 12 is substantially concentrically (coaxially) fixed to a frame end 14 on pedestals 15 provided at edge portions of the frame end 14 with fixing metals 20.

Wirings that connect to power terminals 32 of the power modules 11a, 11b are formed on the power board 12 so that smoothing capacitors are charged by power supplied from an external power source and current of the smoothing capacitors is applied, as a drive current, to the three-phase windings of the two systems of the electric motor 8 through the power modules 11a, 11b. As shown in FIG. 2, smoothing capacitors 16, connectors 17 and 18 and a choking coil (not shown) etc. are mounted on the power board 12, as necessary. The smoothing capacitors 16 also serve as an element of a filter circuit for reducing noises that come from other devices sharing the power source. The connector 17 is, for instance, a connector to which a harness for power supply from the power source is connected. The connector 18 is, for instance, a connector to which a harness to receive control signals from a main controller of a vehicle or a harness to send control signals from the control board 13 and sensor signals etc. to the main controller is connected.

The control board 13 is a control circuit board to control operation of the power modules 11a, 11b with the control board 13 electrically connecting with the power board 12. As shown in FIG. 1, the control board 13 is accommodated inside the frame end 14 that is mounted at one end side of a motor casing (not shown) of the electric motor 8 shown in FIG. 6. The control board 13 is substantially concentrically (coaxially) fixed to the frame end 14 on pedestals 19 provided in the frame end 14 with fixing metals 20.

Figure 5:
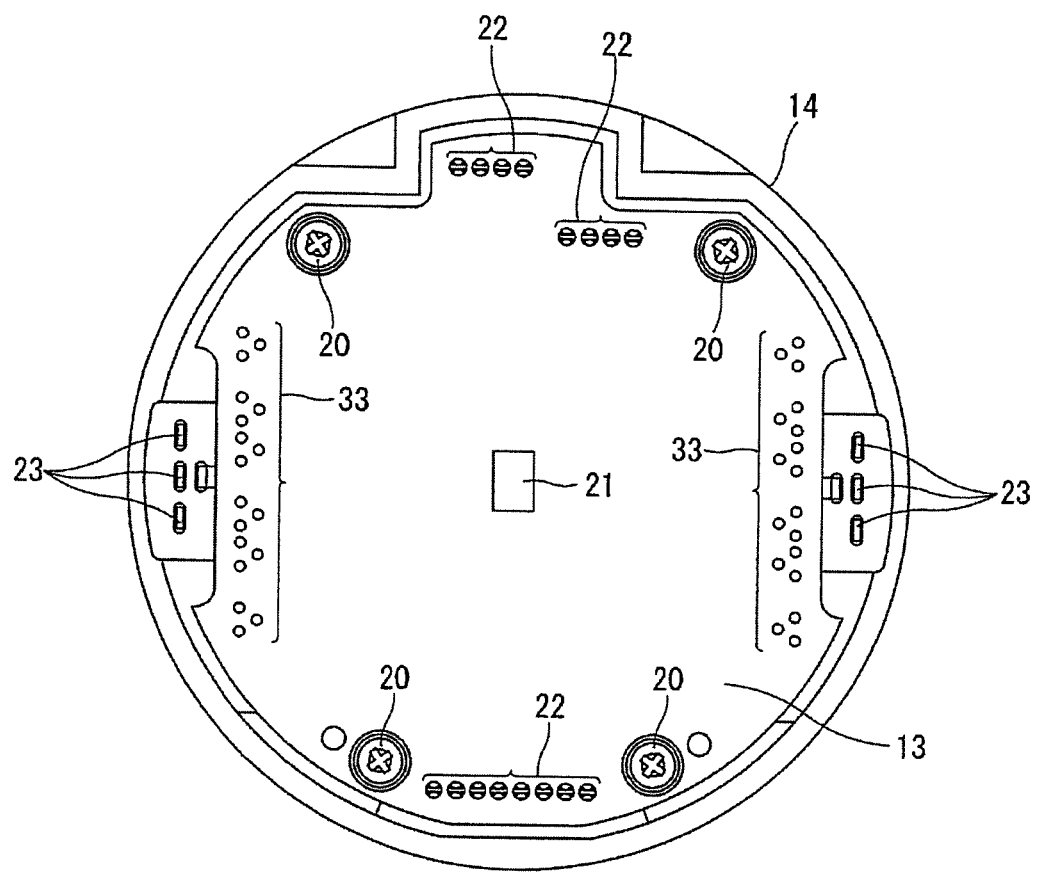
FIG. 5 is a plan view showing a back of a control board used in the electronic control device.

A rotation angle sensor 21, a well-known custom IC (not shown), a microcomputer (not shown) and a pre-driver (not shown) etc. are mounted on the control board 13, as necessary. As shown in FIG. 5, the rotation angle sensor 21 is provided at the substantially middle on a surface of the control board 13 which faces the electric motor 8.

Further, the control board 13 is provided with a circuit that sends the control signals to inverter main circuit elements that are elements of the power modules 11a, 11b, more specifically, MOSFETs (Metal Oxide Semiconductor Field-Effect Transistor). In this manner, the control board 13 is configured so that the power modules 11a, 11b are electrically connected to the control board 13 and a control current for controlling the electric motor 8 flows to the power modules 11a, 11b.

Figure 3:
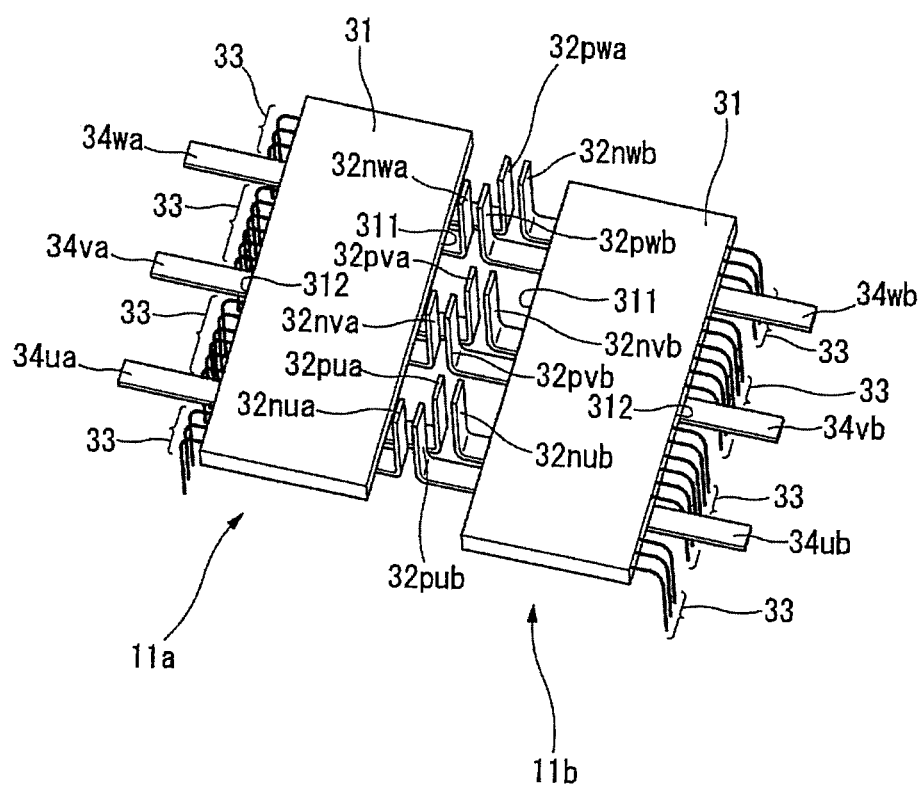
FIG. 3 is a perspective view showing an arrangement of power modules in the electronic control device.

The power modules 11a, 11b each have a main unit 31 in which an inverter circuit that drives the electric motor 8 is mounted, as shown in FIG. 3.

Three pairs of power terminals $32pua$, $32nua$, $32pva$, $32nva$, $32pwa$ and $32nwa$ are drawn from one side longitudinal end portion 311 of the main unit 31 of the power module 11a. Further, control terminals 33 and three-phase motor terminals $34ua$, $34va$ and $34wa$ are drawn from the other side longitudinal end portion 312 of the main unit 31 of the power module 11a.

Three pairs of power terminals $32pub$, $32nub$, $32pvb$, $32nvb$, $32pwb$ and $32nwb$ are drawn from one side longitudinal end portion 311 of the main unit 31 of the power module 11b. Further, control terminals 33 and three-phase motor terminals $34ub$, $34vb$ and $34wb$ are drawn from the other side longitudinal end portion 312 of the main unit 31 of the power module 11b.

As shown in FIG. 3, each of the power terminals $32pua$, $32nua$, $32pva$, $32nva$, $32pwa$, $32nwa$ and $32pub$, $32nub$, $32pvb$, $32nvb$, $32pwb$, $32nwb$ protrudes from the one side longitudinal end portion 311 of the main unit 31 in a width direction of the main unit 31, and is vertically bent at some midpoint of the power terminal and extends upwards.

In particular, negative electrode side power terminals $32nua$, $32nva$, $32nwa$ and $32nub$, $32nvb$, $32nwb$ are formed so that their protruding lengths in the width direction are shorter than those of positive electrode side power terminals $32pua$, $32pva$, $32pwa$ and $32pub$, $32pvb$, $32pwb$ respectively.

As shown in FIGS. 1 and 3, each of the motor terminals $34ua$, $34va$, $34wa$ and $34ub$, $34vb$, $34wb$ protrudes from the other side longitudinal end portion 312 of the main unit 31 in the width direction of the main unit 31, and is vertically bent at some midpoint of the motor terminal and extends upwards.

Each of the control terminals 33 protrudes from the other side longitudinal end portion 312 of the main unit 31 in the width direction of the main unit 31, and is vertically bent at some midpoint of the control terminal and extends downwards.

As shown in FIG. 1, the power modules 11a, 11b are arranged parallel to each other in the same plane on pedestals 141 provided at end portion of the frame end 14.

Figure 4:
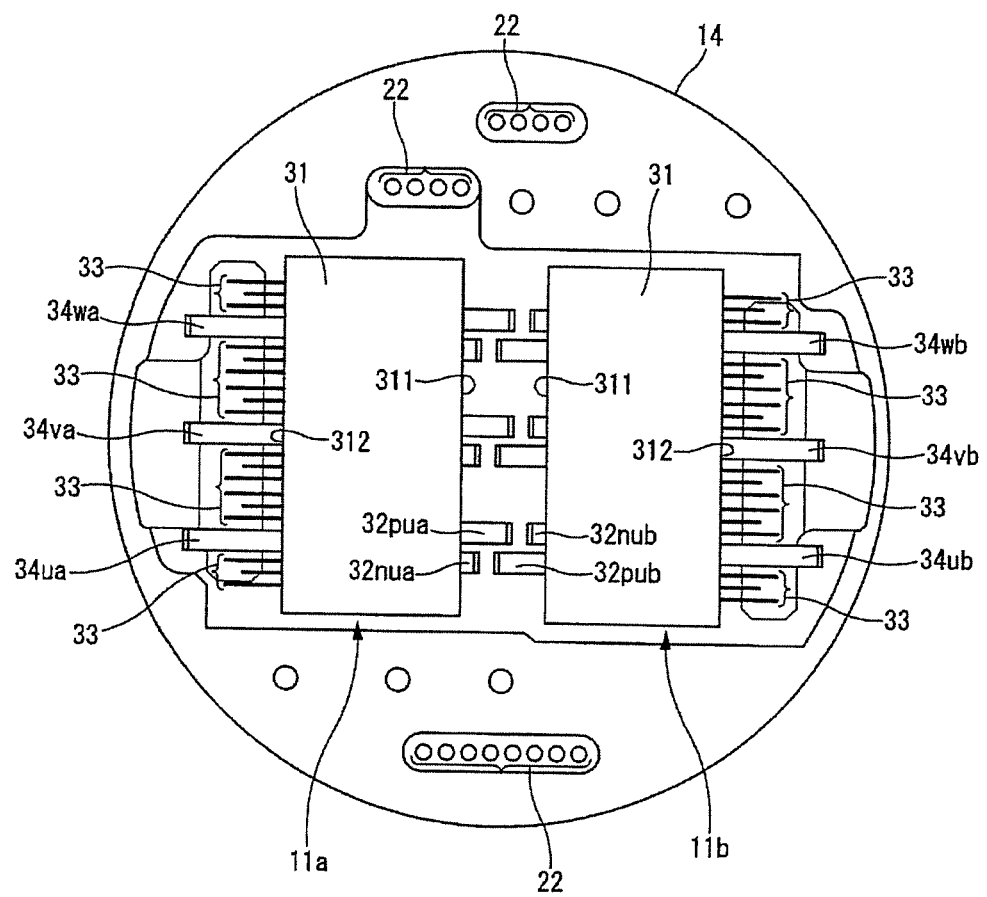
FIG. 4 is a plan view showing the arrangement of power modules in the electronic control device.

In this arrangement, as shown in FIGS. 1 and 4, the positive electrode side power terminals $32pua$, $32pva$ and $32pwa$ drawn from the one side longitudinal end portion 311 of the main unit 31 of the power module 11a are positioned close to the negative electrode side power terminals $32nub$, $32nvb$ and $32nwb$ drawn from the one side longitudinal end portion 311 of the main unit 31 of the power module 11b facing the one side longitudinal end portion 311 of the power module 11a with these $32pua$, $32pva$, $32pwa$ and $32nub$, $32nvb$, $32nwb$ respectively facing each other.

On the other hand, the negative electrode side power terminals $32nua$, $32nva$ and $32nwa$ drawn from the one side longitudinal end portion 311 of the main unit 31 of the power module 11a are positioned close to the positive electrode side power terminals 32pub, 32pvb and 32pwb drawn from the one side longitudinal end portion 311 of the main unit 31 of the power module 11b facing the one side longitudinal end portion 311 of the power module 11a with these 32nua, 32nva, 32nwa and 32pub, 32pvb, 32pwb respectively facing each other.

Each power terminal 32 and each motor terminal 34 of the power modules 11a, 11b are electrically connected to and fixed to the power board 12 by soldering, as shown in FIGS. 1 and 2.

The motor terminals 34 could be connected to lead wires of the electric motor 8 in the air (i.e. in a manner of a floating connection) when assembling the electronic control device. Thus, the motor terminals 34 are not necessarily connected to the power board 12. Further, depending on circuit designs of the power board 12 and the control board 13, the motor terminals 34 might be connected to the control board 13.

On the other hand, the control terminals 33 of the power modules 11a, 11b are introduced into the frame end 14 through terminal introduction openings 140 formed at the end portion of the frame end 14, and are electrically connected to and fixed to the control board 13 by soldering.

The power board 12 and the control board 13 are electrically connected through lead frames 22 that electrically connect a control circuit of the control board 13 and a power circuit of the power board 12. The lead frames 22 are also connected to and fixed to the power board 12 and the control board 13 by soldering.

Further, three-phase bus bars 23 are electrically connected to the power board 12 by soldering. The bus bars 23 are introduced into the frame end 14 through the openings 140, and are electrically connected to the electric motor 8 shown in FIG. 6.

The power modules 11a, 11b, the power board 12, the control board 13 and the frame end 14 explained above are accommodated in a case 24 shown in FIG. 1. The case 24 has, on a top plate 240 thereof, an opening 241 through which the connectors 17 and 18 are introduced.

Working of the electric power steering device 6 will be explained with reference to FIGS. 1 and 6.

When the steering shaft 2 is turned in any turning direction by the steering wheel operation, the turning direction and the turning torque of the steering shaft 2 are detected by the torque sensor 7. The control circuit of the control board 13 calculates a drive operation amount of the electric motor 8 on the basis of detection values of the torque sensor 7 and the rotation angle sensor 21. The power modules 11a, 11b drive the electric motor 8 according to a control signal based on a value of the calculated drive operation amount. At this time, a control is performed so that the same current flows to the corresponding three-phase terminals of the power module 11a and the power module 11b at an arbitrary time point. With this control, the windings of the two systems of the electric motor 8 generate the substantially same torque, and the output shaft of the electric motor 8 rotates so as to drive and rotate the steering shaft 2 in the same direction as an operating direction of the steering wheel. This rotation of the output shaft of the electric motor 8 is transmitted to the rack (not shown) through the pinion (now shown) and the gear 10.

In particular, in the present embodiment, as shown in FIG. 4, the positive electrode side power terminals 32pua, 32pva and 32pwa of the power module 11a are positioned close to the negative electrode side power terminals 32nub, 32nvb and 32nwb of the power module 11b with these 32pua, 32pva, 32pwa and 32nub, 32nvb, 32nwb respectively facing each other. Further, the negative electrode side power terminals 32nua, 32nva and 32nwa of the power module 11a are positioned close to the positive electrode side power terminals 32pub, 32pvb and 32pwb of the power module 11b with these 32nua, 32nva, 32nwa and 32pub, 32pvb, 32pwb respectively facing each other.

As explained above, since the power terminals, which are opposite to each other in polarity, of the two-system power modules 11a, 11b face each other, in-phase currents (or common-mode currents) of both these power modules 11a, 11b are cancelled or offset. This gives rise to an increase of an effect of cancelling an influence of magnetic field generated in the power modules 11a, 11b, then an inductance of the power circuit of the power board 12 is reduced. As a consequence, the switching loss is reduced, the noise level is reduced, and the voltage-use ratio of the battery power is improved.

That is to say, in a case of an electronic control device having a single power module, there is a limitation on reduction in the inductance which can be obtained by arranging the positive electrode side power terminal and the negative electrode side power terminal close to each other.

In contrast to this, in the case of the present embodiment in which the electronic control device has the two-system power modules, the power terminal of one power module is positioned close to the opposite polarity power terminal of the other power module in a manner of surface-to-surface, thereby significantly reducing the inductance of the power circuit, as compared with the electronic control device having the single power module.

When explaining the electronic control device having the single power module as an example, the following has been experimentally found; for instance, when a distance between a pair of copper power terminals p and n is 0.9 mm, a value of the inductance is approx. 11 nH. In addition, when the distance between the pair of copper power terminals p and n is 0.5 mm, the value of the inductance is approx. 9 nH.

In contrast to this, in the case of the electronic control device having the two-system power modules, the following was experimentally found; for instance, when each facing distance between the opposite polarity power terminals of one of a pair of copper power terminals (a distance between two terminals is 0.9 mm) of one power module and one of a pair of copper power terminals (a distance between two terminals is 0.9 mm) of the other power module, like the present embodiment, is 20 mm, a value of the inductance is approx. 11 nH. In addition, when the facing distance is 0.5 mm, the value of the inductance is less than 6 nH.

As explained above, by arranging the positive electrode side power terminals of the one power module of the two-system power modules in positions close to the negative electrode side power terminals of the other power module so as to face the negative electrode side power terminals of the other power module, it is possible to reduce the value of the inductance by approx. 60%, as compared with the electronic control device having the single power module.

Further, especially in the present embodiment, the power modules 11a, 11b are arranged in the same plane, and the power terminals 32 of the power module 11a are drawn from the longitudinal end portion 311 of the main unit 31 of the power module 11a, which faces the longitudinal end portion 311 of the main unit 31 of the power module 11b. With this arrangement, since the power terminals 32 of the power module 11a and the power terminals 32 of the power module 11b, which are opposite to each other in polarity, can be positioned close to each other so as to face each other, it is possible to reduce the inductance of the power circuit while avoiding an increase in size of the electronic control device.

In addition, the power terminals 32 of the power modules 11a, 11b are formed so that the protruding lengths of the negative electrode side power terminals in the width direction of the main unit 31 are shorter than those of the positive electrode side power terminals. In this manner, since the protruding lengths of the positive and negative electrode side power terminals in the width direction of the main unit 31 are different, as shown in FIG. 3, the power modules 11a, 11b can be arranged in a closer position in the same plane. It is therefore possible to enhance the effect of reducing the inductance of the power circuit. Size reduction of the electronic control device 9 can also be achieved.

Moreover, as shown in FIG. 1, the power modules 11a, 11b are arranged in the same plane at the end portion of the frame end 14, and the control terminals 33 of the power modules 11a, 11b are drawn from the end portions, which do not face each other, of the power modules 11a, 11b (i.e. the end portions of the power modules 11a, 11b, which each face an inner surface 242 of the case 24 accommodating the power modules 11a, 11b). With this arrangement, since the control terminals 33 can be connected to and fixed to the control board 13 in positions close to edges of the control board 13, it is possible to effectively use a mounting surface of the control board 13.

Furthermore, in the same manner as the control terminals 33, the motor terminals 34 of the power modules 11a, 11b are also drawn from the end portions, which do not face each other, of the power modules 11a, 11b. With this arrangement, the motor terminals 34 can be electrically connected to the control board 13 or the power board 12 in positions close to edges of the control board 13 or the power board 12. It is thus possible to keep a dead space on the control board 13 or the power board 12 to a minimum. The effective use of the mounting surface of the control board 13 or the power board 12 can therefore be made.

Although the present invention has been explained on the basis of the embodiment, the structure or configuration of the present invention is not limited to the embodiment. The present invention includes all design modifications and equivalents belonging to the technical scope of the present invention.

For instance, although the above embodiment shows the electronic control device having the two-system power modules, the present invention can be applied to an electronic control device having a plurality of power modules such as power modules of four systems or power modules of six systems. Also in this case, the same effect as that of the above embodiment can be obtained.

Further, the arrangement of the power module of the present invention is not limited to the above electronic control device of the electric power steering device having the rack. For instance, the arrangement of the power module of the present invention can be applied to an electronic control device of an electric power steering device having a column, and also applied to an electronic control device of a control system having an electric motor such as a brake control device.

The invention claimed is:

1. An electronic control device configured to control a motor, comprising:
a plurality of power modules configured to drive the motor and each having a plurality of positive electrode side power terminals and a plurality of negative electrode side power terminals, wherein
each of the positive and negative electrode side power terminals protrudes in a width direction of the respective power modules that is a direction along a minor axis of the respective power modules which is perpendicular to a length direction along a major axis of the respective power modules, and is bent in a height direction of the respective power modules, the height direction being perpendicular to the width direction and the length direction,
the positive and negative electrode side power terminals of at least one power module of the plurality of power modules are arranged in positions proximate to and facing, along a first side of the at least one power module, the positive and negative electrode side power terminals of another power module of the plurality of power modules at respective bending portions, with the positive and negative electrode side power terminals of the at least one power module and the positive and negative electrode side power terminals of the another power module being opposite to each other in polarity, and
the positive and negative electrode side power terminals of the at least one power module and the positive and negative electrode side power terminals of the another power module face each other at positions in a staggered arrangement such that a pair of positive and negative electrode side power terminals is offset so as to be displaced in the width direction from an adjacent pair of positive and negative electrode side power terminals.

2. The electronic control device as claimed in claim 1, wherein:
the plurality of power modules are arranged in a same plane, and
the power terminals of the at least one power module are drawn from a first end portion, which faces the another power module, of a main body of the at least one power module.

3. The electronic control device as claimed in claim 2, wherein:
protruding lengths, in a width direction of the main body, of positive and negative electrode side terminals of the power terminals are different from each other.

4. The electronic control device as claimed in claim 2, wherein:
control terminals of the at least one power module are drawn from a second end portion, which does not face the another power module, of the main body of the at least one power module.

5. The electronic control device as claimed in claim 4, wherein:
motor terminals of the at least one power module are drawn from a second end portion, which does not face the another power module, of the main body of the at least one power module.

6. The electronic control device as claimed in claim 4, further comprising:
a power board to which the power terminals of the power modules are electrically connected;
a control board to which the control terminals of the power modules are electrically connected; and
a case which accommodates therein the power modules, the power board and the control board,
wherein the control terminals of the at least one power module are drawn from the second end portion, which faces an inner surface of the case, of the main body of the at least one power module.

7. The electronic control device as claimed in claim 4, further comprising:
- a power board to which the power terminals and the motor terminals of the power modules are electrically connected;
- a control board to which the control terminals of the power modules are electrically connected; and
- a case which accommodates therein the power modules, the power board and the control board,
- wherein the control terminals and the motor terminals of the at least one power module are drawn from the second end portion, which faces an inner surface of the case, of the main body of the at least one power module.

8. The electronic control device as claimed in claim 4, wherein:
- a power board to which the power terminals of the power modules are electrically connected;
- a control board to which the control terminals and the motor terminals of the power modules are electrically connected; and
- a case which accommodates therein the power modules, the power board and the control board,
- wherein the control terminals and the motor terminals of the at least one power module are drawn from the second end portion, which faces an inner surface of the case, of the main body of the at least one power module.

9. The electronic control device of claim 4, wherein the positions where the power terminals of the at least one power module are arranged are closer to the power terminals of the another power module than to the control terminals of the at least one power module.

10. An electric power steering device comprising:
- a plurality of power modules configured to drive an electric motor of the electric power steering device and each having a plurality of positive electrode side power terminals and a plurality of negative electrode side power terminals, wherein each of the positive and negative electrode side power terminals protrudes in a width direction of the respective power modules that is a direction along a minor axis of the respective power modules which is perpendicular to a length direction along a major axis of the respective power modules, and is bent in a height direction of the respective power modules, the height direction being perpendicular to the width direction and the length direction, the positive and negative electrode side power terminals of at least one power module of the plurality of power modules are arranged in positions proximate to and facing, along a first side of the at least one power module, the positive and negative electrode side power terminals of another power module of the plurality of power modules at respective bending portions, with the positive and negative electrode side power terminals of the at least one power module and the positive and negative electrode side power terminals of the another power module being opposite to each other in polarity, and the positive and negative electrode side power terminals of the at least one power module and the positive and negative electrode side power terminals of the another power module face each other at positions in a staggered arrangement such that a pair of positive and negative electrode side power terminals is offset so as to be displaced in the width direction from an adjacent pair of positive and negative electrode side power terminals.

11. The electric power steering device of claim 9, wherein the positions where the power terminals of the at least one power module are arranged are closer to the power terminals of the another power module than to control terminals of the at least one power module.

* * * * *